Oct. 31, 1933.  C. T. EDWARDS  1,933,522
TANK GAUGE
Filed March 10, 1931  2 Sheets-Sheet 2

INVENTOR
C.T. EDWARDS
BY his ATTORNEY

Patented Oct. 31, 1933

1,933,522

UNITED STATES PATENT OFFICE 1,933,522

TANK GAUGE

Clarence T. Edwards, Cradock, Va., assignor to The Texas Company, New York N. Y., a corporation of Delaware Application March 10, 1931. Serial No. 521,467

12 Claims (Cl. 73—82)

My invention relates to gauging apparatus, more particularly to a device for gauging the height of a liquid such as oil in a tank or other receptacle and has for its principal object the provision of a measuring instrument which will accurately indicate to a small fraction of an inch the height of such liquid.

It is common practice, in the gauging of tanks, to remove a cover or lid from the top of the tank and then insert a graduated rod in the liquid. Frequently there are valuable gases in the tank above the liquid and a portion of these gases are vented to the atmosphere and lost when the gauge cover is removed. Furthermore these gases are often poisonous and may seriously injure the health of the gauger. Moreover, fires are often caused by the gauge covers being accidentally left open. It is thus a further object of my invention to provide a gauge in which all of the moving parts are enclosed and which can thus be read without uncovering any portion of the tank containing the liquid. My invention is thus particularly suitable for use with pressure or spherical tanks.

Through the use of gauges embodying my invention, much time can be saved since it is merely necessary for the gauger to read the figures on the gauge as one would read any ordinary type of meter.

In carrying out my invention I have provided a gauge adapted to be affixed to a tank and in which a drum is moved along a fixed shaft in accordance with variations in the height of the liquid in the tank, the position of the drum being readable on a fixed scale. A vernier disc having peripheral indicia is secured to the drum and moves therewith so that the height of the liquid can be determined in inches and fractions of an inch as well as in feet. A housing completely encloses the gauge so that gases within the tank cannot escape.

Figure 1:
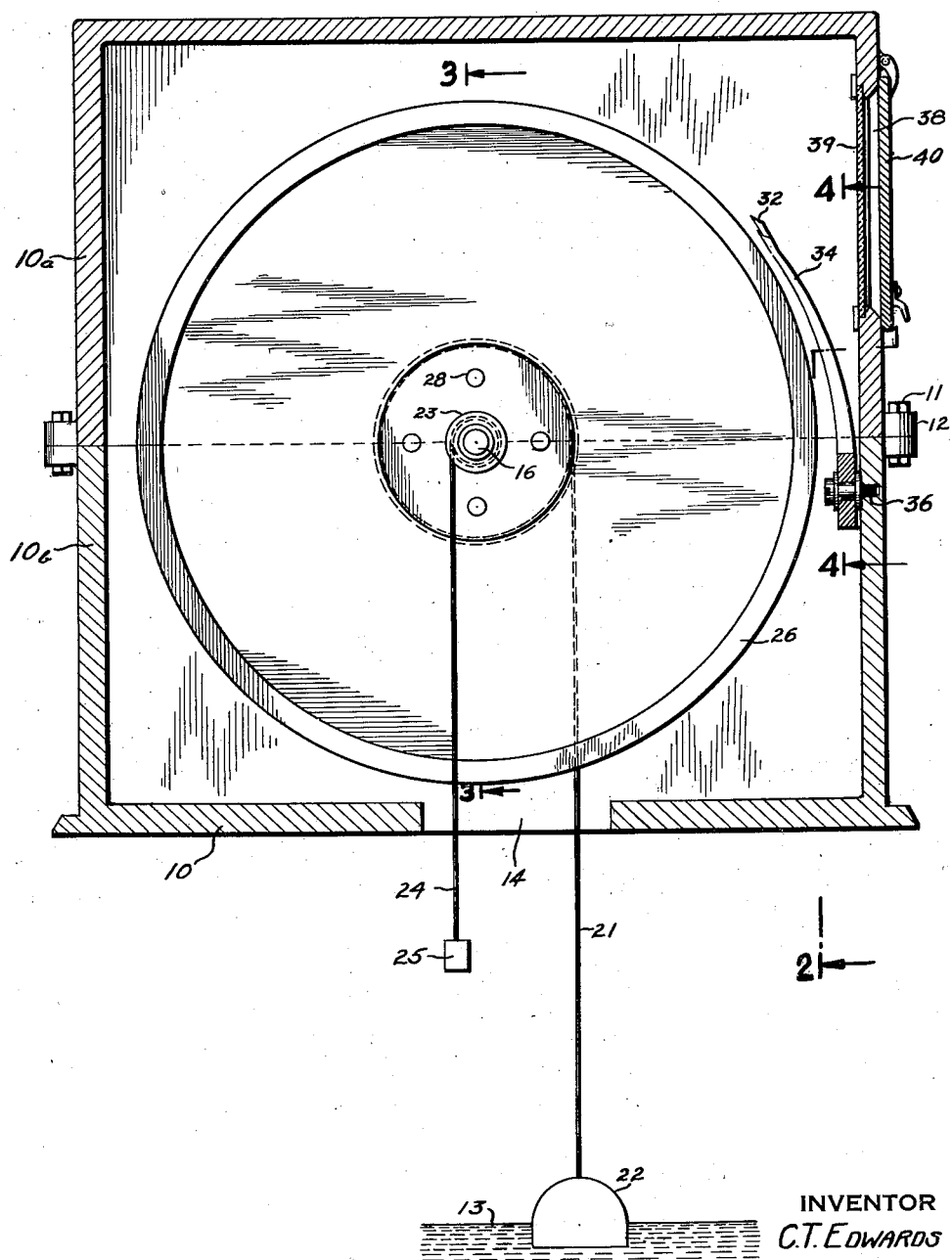
Figure 2:
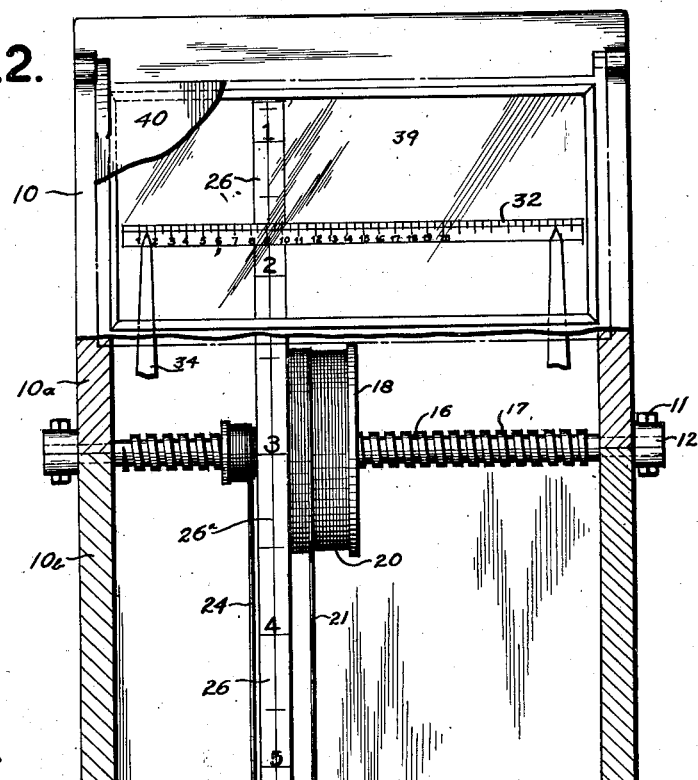
Figure 3:
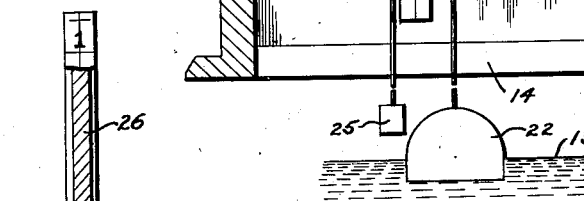
Figure 4:
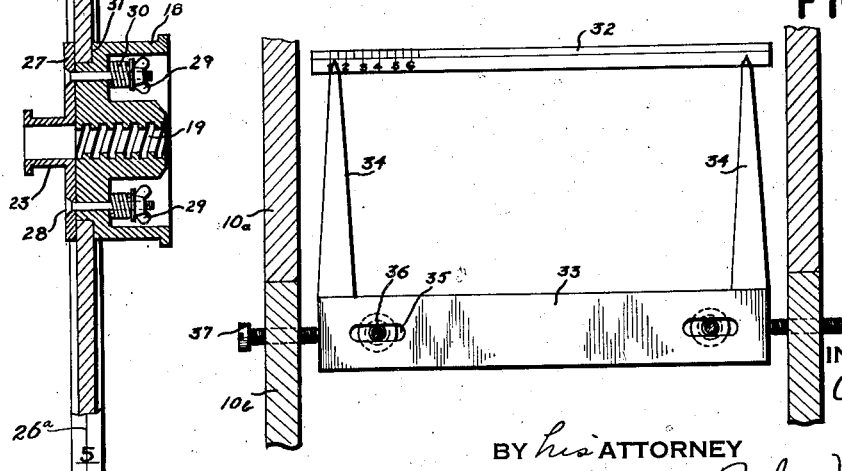

For a better understanding of my invention reference may be had to the accompanying description and drawings, in which Fig. 1 is a side sectional elevation of a preferred embodiment of my invention; Fig. 2 is a front elevation partly in section, being taken on line 2—2 of Fig. 1; Fig. 3 is an elevation partly in section of the indicating drum and disc, this view being taken on line 3—3 of Fig. 1, while Fig. 4 is an elevation showing the mounting of the scale, taken on line 4—4 of Fig. 1.

Referring to the drawings, I have shown the gauge as being mounted in a housing 10, this housing being preferably formed of an upper section 10a and a lower section 10b suitably fastened together by bolts 11 passing through projecting lugs 12. The housing 10 is adapted to be secured by any suitable means to the upper or cover portion of the tank containing the liquid 13 to be gauged and the bottom wall of the housing 10 is provided with a slot or opening 14 for registering with a similar opening in the tank, the purpose of this opening being later described. A shaft 16 is rigidly secured to opposite side walls of the housing at about the center thereof and this shaft is provided with a single continuous thread 17, preferably of the square type. A drum 18 mounted on the shaft 16 is provided with a center groove 19 which is adapted to engage the thread 17 so that when the drum is rotated it will be moved longitudinally with respect to the fixed shaft 16. The periphery of the drum 18, which may be grooved as at 20, has wound thereon a wire or cable 21 one end of which may be attached to the drum while the other end passes through the opening 14 and is attached to a suitable float 22 supported on the surface of the liquid 13. A second and smaller drum 23 is secured to the drum 18 as shown more clearly in Fig. 3 and this second drum also has wound thereon a wire or cable 24, the lower end of which passes through the opening 14 and is attached to a suitable counterweight 25. It will thus be observed that as the liquid 13 rises or lowers in the tank, the float 22 will be moved accordingly and through the cable 21 will cause the drum 18 to rotate about and move longitudinally of the shaft 16. The counterweight 25 will, of course, move in the opposite direction to the float 22 and will serve to take up slack and to hold the cable 21 taut.

I wish it to be understood that while I have shown my gauge adapted to be secured to the upper surface of a tank, the gauge might also be attached to the side of the tank at a position so that it could easily be read by an operator standing on the ground. In this case the cable 21 could pass from the gauge upwardly and over a suitable pulley and then downwardly to the float 22 through a small opening in the upper surface of the tank. Furthermore, while I have shown the cable 21 as being unsupported in the tank it is also within the scope of my invention to provide a suitable guide through which the cable may pass freely and at the same time be maintained in a substantially vertical position, thus obviating any error due to the float 22 moving away from its position directly below the opening 14. It is also obvious that my device may be used with pressure or spherical tanks simply by forming the bottom of the housing 10b to fit the curved surface of the tank.

In order to be able to obtain accurate readings of the height of the liquid 13 I have provided a vernier disc 26 which is mounted upon and supported by the drum 18, as is shown more clearly in Fig. 3. Since it may be desirable to adjust the vernier disc 26 angularly with respect to the drum 18, I have provided a clutch mechanism arranged so that the disc 26 will be normally held in fixed relation to the drum 18 while still permitting adjustment of the disc relative to the drum 18. To this end the small drum 23 is provided with a flange 27 adapted to abut against one side of the drum 18, and a plurality of bolts 28 pass through the flange 27 and the drum 18 and have threaded thereon wing nuts 29.

A helical compression spring 30 is arranged between each wing nut 29 and the surface of the drum 18, and these springs serve to bias the flange 27 toward the drum 18, thus compressing and holding the disc 26 in friction engagement with the drum 18. Thus, if it is desired to adjust the angular position of the disc 26 it is merely necessary to hold the disc 18 and rotate the drum 26 thereupon the desired amount.

In order to indicate the position of the drum 18 and disc 26 with respect to the shaft 16, I have provided a linear scale 32 supported from a bar 33 by means of a pair of curved arms 34. The bar 33 is provided with a pair of slots 35 which cooperate with a pair of screws 36 to provide an adjustable mounting for the scale, these screws being secured to the inner surface of the front of the housing 10, as will be observed with reference to Fig. 1. By loosening the screws 36 and then adjusting a pair of screws 37 threaded through the sides of the housing 10, the scale 32 may be moved longitudinally with respect to the shaft 16.

The front of the upper portion 10a of the housing is provided with a rectangular opening 38 which has mounted therein a window 39 of glass or other suitable transparent material. In order to protect the window 39, and also to prevent the direct rays of the sun from shining into the tank, a cover 40 is pivotally mounted on the front of the upper portion 10a of the housing and is normally held closed by gravity.

Preferably the diameter of the drum 18 and the pitch of the thread 17 are so proportioned that when the float 22 moves one foot in a vertical direction the drum 18 and the disc 26 will be moved either to the right or left, and amount equal to the pitch of the thread 17. The graduations on the scale 32 are placed at intervals equal to the pitch of the thread 17.

The edge of the disc 26 is provided with a center line 26a which serves as a pointer to cooperate with the fixed scale 32 and thus it will be seen that as the float 22 moves upwardly or downwardly a distance of one foot, the disc 26 and center line 26a will move either to the right or left a distance denoted by one division on the scale 32 which is calibrated in feet. The indicia on the periphery of the vernier disc 26 by registering with the upper edge of the scale 32 will give an indication of the number of inches and fractions of inches in the height of the liquid 13.

It will thus be observed that I have provided a micrometer gauging device by means of which the height of liquid in a tank may be measured to the fraction of an inch and which by being entirely enclosed will obviate the necessity for opening any portion of the tank and thereby allowing gases to escape to the atmosphere. In reading the gauge it is merely necessary for the operator to raise the cover 40 and read the position of the disc 26 with respect to the scale 32. The time necessary for the reading of the gauge is thus reduced greatly and a much larger number of tanks can be gauged in a relatively short time. Merely by changing the pitch of the thread 17 and the proportions of the other parts, the device can be made to read even more accurately. This may be desirable where very large tanks are used.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

I claim:

1. In a gauging device, a housing, a threaded shaft rigidly supported by said housing, a drum threaded on said shaft and capable of longitudinal movement with respect to said shaft, a vertically movable member, means for rotating said drum and moving said drum longitudinally of said shaft in response and in proportion to changes in position of said vertically movable member, and means for indicating the position of said drum with respect to said shaft.

2. In a gauging device, a housing, a threaded shaft rigidly supported by said housing, a drum threaded on said shaft and capable of longitudinal movement with respect thereto, a vertically movable member, means for rotating said drum to move said drum longitudinally of said shaft in response and in proportion to changes in position of said vertically movable member, and a scale supported by said housing for indicating the position of said drum with respect to said shaft.

3. In a gauging device, a housing, a threaded shaft rigidly supported by said housing, a drum threaded on said shaft and capable of longitudinal movement with respect thereto, a vertically movable member, means for rotating said drum to move said drum longitudinally of said shaft in response and in proportion to changes in position of said vertically movable member, a scale supported by said housing for indicating the position of said drum with respect to said shaft, and means for adjusting the position of said scale relatively to said shaft.

4. In a gauging device, a housing, a threaded shaft rigidly secured within said housing, a drum threaded upon said shaft so as to be capable of longitudinal movement with respect thereto, a float, means for rotating said drum and moving said drum longitudinally of said shaft in accordance with upward and downward movement of said float, a disc secured to said drum and a scale supported by said housing and cooperating with said disc for indicating the position of said drum with respect to said shaft.

5. In a gauging device, a housing, a threaded shaft rigidly supported within said housing, a drum threaded on said shaft and capable of longitudinal movement relatively thereto, a float, a cable attached to said float and secured to said drum so as to rotate said drum and move said drum longitudinally of said shaft in response and in proportion to vertical movement of said float, a second drum secured to said first mentioned drum, a counterweight, means connecting said counterweight to said second drum so as to maintain said cable taut, a disc secured to said drums and a scale supported by said housing and cooperating with said disc for indicating the position of said first mentioned drum with respect to said shaft.

6. In a gauging device, a housing, a threaded shaft rigidly supported within said housing, a drum threaded on said shaft and capable of longitudinal movement relatively thereto, a float, a cable attached to said float and secured to said drum so as to rotate said drum and move said drum longitudinally of said shaft in response and in proportion to vertical movement of said float, a vernier disc mounted on said drum and provided with indicia around its periphery, and a graduated scale supported in parallel relation to said shaft and adapted to cooperate with said vernier disc so as to indicate both the rotative and longitudinal position of said disc with respect to said shaft.

7. In a gauging device, a housing, a threaded shaft rigidly supported within said housing, a drum threaded on said shaft and capable of longitudinal movement relatively thereto, a float, a cable attached to said float and secured to said drum so as to rotate said drum and move said drum longitudinally of said shaft in response and in proportion to vertical movement of said float, a vernier disc rotatably mounted on said drum, a clutch associated with said drum for frictionally holding said disc in engagement with said drum and a scale supported by said housing and provided with graduations adapted to cooperate with said disc to indicate the longitudinal position thereof, said disc being provided with indicia adapted to cooperate with said scale to indicate the rotative position of said disc with respect to said shaft.

8. In a gauging device, a housing, a threaded shaft rigidly supported by said housing, a drum threaded on said shaft and capable of longitudinal movement with respect to said shaft, a vertically movable member, means for moving said drum longitudinally in response and in proportion to changes in position of said vertically movable member, an annular member supported by and movable with said drum, said annular member being provided with peripheral indicia, and a relatively fixed scale supported in close proximity to the periphery of said annular member, said scale being provided with graduations for indicating the longitudinal position of said disc and said peripheral indicia being adapted to cooperate with said scale so as to indicate the rotative position of said disc with respect to said shaft.

9. In a gauging device, a housing, a threaded shaft rigidly supported by said housing, a drum threaded on said shaft and capable of longitudinal movement with respect to said shaft, a vertically movable member, means for moving said drum longitudinally in response and in proportion to changes in position of said vertically movable member, an annular member supported by and movable with said drum, said annular member being provided with peripheral indicia, a relatively fixed scale supported in close proximity to the periphery of said annular member, said scale being provided with graduations for indicating the longitudinal position of said disc and said peripheral indicia being adapted to cooperate with said scale so as to indicate the rotative position of said disc with respect to said shaft, and releasable means for holding said annular member in fixed position with respect to said drum.

10. In a gauging device, a housing, a threaded shaft rigidly secured within said housing, a drum threaded upon said shaft so as to be capable of longitudinal movement with respect thereto, a float, means for rotating said drum and moving said drum longitudinally of said shaft in accordance with upward and downward movement of said float, a disc secured to said drum, a scale supported by said housing and cooperating with said disc for indicating the position of said drum with respect to said shaft, and means for adjusting the position of said scale longitudinally with respect to said shaft.

11. In a gauging device, a housing, a threaded shaft rigidly supported by said housing, a drum threaded on said shaft and capable of longitudinal movement with respect to said shaft, a vertically movable member, means for rotating said drum to move said drum longitudinally of said shaft in response and in proportion to changes in position of said vertically movable member, means for indicating the position of said drum with respect to said shaft, a sight window in said housing, and a cover member for protecting said window.

12. In a gauging device, a housing, a threaded shaft rigidly supported by said housing, a drum threaded on said shaft and capable of longitudinal movement with respect to said shaft, a vertically movable member, means for moving said drum longitudinally in response and in proportion to changes in position of said vertically movable member, an annular member supported by and movable with said drum, said annular member being provided with peripheral indicia, a relatively fixed scale supported in close proximity to the periphery of said annular member, said scale being provided with graduations for indicating the longitudinal position of said disc and said peripheral indicia being adapted to cooperate with said scale so as to indicate the rotative position of said disc with respect to said shaft, a transparent window in said housing, and a cover member pivotally mounted on said housing for protecting said window.

CLARENCE T. EDWARDS.